(12) United States Patent
Engin et al.

(10) Patent No.: US 12,518,407 B2
(45) Date of Patent: Jan. 6, 2026

(54) ALIGNING IMAGE DATA AND MAP DATA (71) Applicant: SAMSUNG ELECTRONICS CO., LTD., Suwon-si (KR)

(72) Inventors: Kazim Selim Engin, Weehawken, NJ (US); Jun-Jee Chao, Minneapolis, MN (US); Ibrahim Volkan Isler, Saint Paul, MN (US); Nikhil Narsingh Chavan-Dafle, Jersey City, NJ (US); Bhoram Lee, Princeton, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 83 days.

(21) Appl. No.: 18/586,111

(22) Filed: Feb. 23, 2024

(65) Prior Publication Data
US 2025/0086812 A1 Mar. 13, 2025

Related U.S. Application Data (60) Provisional application No. 63/538,224, filed on Sep. 13, 2023.

(51) Int. Cl.
G06T 7/33 (2017.01)
G06T 5/77 (2024.01)
(Continued)

(52) U.S. Cl.
CPC ............ G06T 7/33 (2017.01); G06T 5/77 (2024.01); G06T 7/13 (2017.01); G06T 7/70 (2017.01);
(Continued)

(58) Field of Classification Search
CPC .... G06T 7/33; G06T 5/77; G06T 7/13; G06T 7/70; G06T 15/20; G06T 2207/10016; G06T 2207/10028; G06V 20/64
See application file for complete search history.

(56) References Cited

U.S. PATENT DOCUMENTS 11,436,812 B2    9/2022  Fleischman et al.
11,585,917 B1 *  2/2023  Wu .................. G06T 17/05
                         (Continued)

FOREIGN PATENT DOCUMENTS

CN    113724369 A    11/2021
CN    112802204 B    12/2022
                    (Continued)

OTHER PUBLICATIONS

Int. Search Report (PCT/ISA/210) dated Aug. 2, 2024 issued by the Int. Searching Authority in App. No. PCT/KR2024/005926.

Primary Examiner — Vijay Shankar
(74) Attorney, Agent, or Firm — Sughrue Mion, PLLC (57) ABSTRACT A method of generating a composite map from image data and spatial map data may include: acquiring a spatial map of an environment; acquiring a plurality of images of a portion of the environment; generating a three-dimensional (3D) image of the portion of the environment using the plurality of images; identifying a floor in the 3D image; generating a synthetic spatial map of the portion of the environment based on the floor in the 3D image; determining a location of the portion of the environment within the spatial map by identifying a region of the spatial map that corresponds to the synthetic spatial map; and generating a composite map by associating the 3D image with the location within the spatial map of the portion of the environment.

20 Claims, 9 Drawing Sheets (51) Int. Cl.
    *G06T 7/13*         (2017.01)
    *G06T 7/70*         (2017.01)
    *G06T 15/20*       (2011.01)
    *G06V 20/64*      (2022.01)

(52) U.S. Cl.
    CPC .............. *G06T 15/20* (2013.01); *G06V 20/64* (2022.01); *G06T 2207/10016* (2013.01); *G06T 2207/10028* (2013.01)

(56) References Cited

U.S. PATENT DOCUMENTS

| | | |
|---|---|---|
| 11,610,379 B2 | 3/2023 | Fleischman et al. |
| 11,734,935 B2 | 8/2023 | Chen et al. |
| 11,928,873 B2 * | 3/2024 | Phalak ............... G06V 10/7625 |
| 2021/0375062 A1 * | 12/2021 | Fleischman ............. G06F 18/24 |
| 2022/0309757 A1 * | 9/2022 | Fleischman ......... G06F 3/04815 |
| 2023/0075389 A1 | 3/2023 | Wu et al. |
| 2023/0121534 A1 | 4/2023 | Rukhovich et al. |
| 2024/0203138 A1 * | 6/2024 | Phalak ................ G06F 18/2431 |

FOREIGN PATENT DOCUMENTS

| | | |
|---|---|---|
| CN | 112833892 B | 12/2022 |
| CN | 116129064 A | 5/2023 |
| JP | 2023-516674 A | 4/2023 |
| KR | 10-2013-0132128 A | 12/2013 |

\* cited by examiner

ALIGNING IMAGE DATA AND MAP DATA

CROSS REFERENCE TO RELATED APPLICATION

This application claims priority from U.S. Provisional Patent Application No. 63/538,224, filed with the United States Patent and Trademark Office on Sep. 13, 2023, the disclosure of which is incorporated herein by reference in its entirety.

BACKGROUND

1. Field

The disclosure concerns imaging, mapping, and computer vision technologies, and more specifically, combining different types of image and map data.

2. Description of Related Art

The use of spatial maps in consumer electronics is increasingly common. Examples of this include consumer grade robots, such as robot vacuum cleaners. Robot vacuum cleaners (RVCs) use two-dimensional Light Detection and Ranging, (2D LiDAR) and other imaging technologies to create a spatial map of the space they clean. This enables the robot vacuum to clean the entire floor surface, and improve efficiency by being cognizant of obstacles and boundaries.

A 2D LiDAR may generate a spatial map that captures a floor layout of a designated area. Nevertheless, these maps lack semantic details about objects or walls within the area. In other words, they do not include qualitative information or labels associated with the objects 220 or walls in the designated area.

Functionality of a residential robot could be enhanced by generating full 3D maps of their working environment. Generating 3D maps of home environments is a challenging problem, with numerous application areas, including immersive technologies and real estate. Even though commercial grade solutions exist, they require expensive hardware and meticulous scanning procedures. Alternatively, using widely available cameras such as those on mobile phones can be used to reconstruct a local area. However, scanning an entire house with a single camera is extremely labor intensive and impractical. Merging scans across rooms would be error-prone due to the lack of images with overlapping features.

Accordingly, it is difficult to practically obtain a full 3D map of the operating environment of robots such as robot vacuum cleaners. It is also difficult to achieve certain user functions with the existing 2D maps used by robots.

SUMMARY

One or more embodiments provide a method and apparatus for aligning images to maps.

If electronic devices such as robot vacuum cleaners had access to a map with semantic information and location information about objects in their environment, they could provide more functions to the user. For example, a user could ask the robot to "sweep up the mess in front of the couch," and the robot could perform that task. With a map including a location and label for the couch, the robot can approach the couch and sweep in front of it.

Accordingly, the disclosure describes embodiments that can enhance robot map data. Given an RGB-D (red, green, blue, depth) image sequence from a scene and a 2D LiDAR map of the same environment, embodiments can align the pose of the first image to the LiDAR map. The benefit of aligning videos to 2D LiDAR scans is at least twofold. First, image sequences with dense scene information can be used to augment 2D LiDAR maps with 3D geometry, texture and semantics information. Second, the LiDAR map can serve as a common coordinate frame to align short clips of videos captured from different locations of the same operating space or building. Therefore, the entire operating space or building can be scanned by aligning independent video sequences to the common LiDAR map.

Currently, there is no existing solution for the problem of registering 2D LiDAR point clouds to reconstructions from RGB-D image sequences. This is a challenging problem: 2D LiDAR point clouds can contain information from the entire floor plan of an operating environment but only at a fixed height, whereas reconstruction point clouds have denser information but only from a local area of the apartment. Therefore, neither point set is a superset of the other, which makes matching or registration challenging. Moreover, the sensing modalities are different and the representation to use for registering a 3D reconstruction to a LiDAR map is not trivial.

According to an aspect of the disclosure, a method of generating a composite map from image data and spatial map data, may include: acquiring a spatial map of an environment; acquiring a plurality of images of a portion of the environment; generating a 3D image of the portion of the environment using the plurality of images; identifying a floor in the 3D image; generating a synthetic spatial map of the portion of the environment based on the floor in the 3D image; determining a location of the portion of the environment within the spatial map by identifying a region of the spatial map that corresponds to the synthetic spatial map; and generating a composite map by associating the 3D image with the location within the spatial map of the portion of the environment.

The method further may include: in the 3D image, inpainting areas of the portion of the environment that are not in the plurality of images.

The method further may include: selecting a first viewpoint for the 3D image based on the location of the first viewpoint relative to the plurality of images; rendering a first 3D image from the first viewpoint; selecting a second viewpoint for the 3D image different from the first viewpoint; rendering a second 3D image from the second viewpoint; and inpainting missing image data in the second 3D image.

The first viewpoint may be selected as a boundary point in a top-down view of the 3D image.

Determining the location of the portion of the environment within the spatial map by identifying the region of the spatial map that corresponds to the synthetic spatial map may include: estimating edges of the floor using ray casting; and determining an alignment between the estimated edges of the floor and the spatial map of the environment.

The spatial map of the environment may be generated using two-dimensional Light Detection and Ranging, (2D LiDAR).

The plurality of images may be obtained from a video of the portion of the environment.

The method further may include: identifying an object in the 3D image; and associating an identity of the object with a location of the object in the composite map.

The spatial map may be generated by a robot.

The plurality of images may be generated by a user terminal.

According to an aspect of the disclosure, an information processing apparatus for generating a composite map from image data and spatial map data, may include: at least one memory storing instructions; and at least one processor operatively connected to the at least one memory. The at least one processor may be configured to execute the instructions to: acquire a spatial map of an environment; acquire a plurality of images of a portion of the environment; generate a 3D image of the portion of the environment using the plurality of images; identify a floor in the 3D image; generate a synthetic spatial map of the portion of the environment based on the floor in the 3D image; determine a location of the portion of the environment within the spatial map by identifying a region of the spatial map that corresponds to the synthetic spatial map; and generate a composite map by associating the 3D image with the location within the spatial map of the portion of the environment.

The at least one processor may be further configured to execute the instructions to: in the 3D image, inpaint areas of the portion of the environment that are not in the plurality of images.

The at least one processor may be further configured to execute the instructions to: select a first viewpoint for the 3D image based on the location of the first viewpoint relative to the plurality of images; render a first 3D image from the first viewpoint; select a second viewpoint for the 3D image different from the first viewpoint; render a second 3D image from the second viewpoint; and inpaint missing image data in the second 3D image.

The first viewpoint may be selected as a boundary point in a top-down view of the 3D image.

Determining the location of the portion of the environment within the spatial map by identifying the region of the spatial map that corresponds to the synthetic spatial map may include: estimating edges of the floor using ray casting; and determining an alignment between the estimated edges of the floor and the spatial map of the environment.

The spatial map of the environment may be generated using two-dimensional Light Detection and Ranging, (2D LiDAR).

The plurality of images may be obtained from a video of the portion of the environment.

The at least one processor may be further configured to execute the instructions to: identify an object in the 3D image; and associate an identity of the object with a location of the object in the composite map.

The spatial map may be generated by a robot.

The plurality of images may be generated by a user terminal.

It should be understood that the general description above and the detailed description in the following are only illustrative and explanatory, and do not limit this disclosure.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Hereinafter, the disclosure is described in detail with reference to the accompanying drawings.

General terms that are currently widely used are selected as possible as terms used in embodiments of the disclosure in consideration of their functions in the disclosure, and may be changed based on the intention of those skilled in the art or a judicial precedent, the emergence of a new technique, or the like. In addition, in a specific case, terms arbitrarily chosen by an applicant may exist. In this case, the meanings of such terms are described in detail in corresponding descriptions of the disclosure. Therefore, the terms used in the disclosure need to be defined based on the meanings of the terms and the content throughout the disclosure rather than simple names of the terms.

In the disclosure, an expression "have," "may have," "include," "may include," or the like, indicates the existence of a corresponding feature (for example, a numerical value, a function, an operation, or a component such as a part), and does not exclude the existence of an additional feature.

Expressions, "at least one of A and B" and "at least one of A or B" and "at least one of A or B" should be interpreted to mean any one of "A" or "B" or "A and B." As another example, "performing at least one of steps 1 and 2" or "performing at least one of steps 1 or 2" means the following three juxtaposition situations: (1) performing step 1; (2) performing step 2; (3) performing steps 1 and 2. Expressions "first," "second," and the like, used in the specification may indicate various components regardless of the sequence and/or importance of the components. These expressions are used only to distinguish one component from another component, and do not limit the corresponding components.

When any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term "include," "formed of," or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

Elements described as "modules" or "part" may be physically implemented by analog and/or digital circuits including one or more of a logic gate, an integrated circuit, a microprocessor, a microcontroller, a memory circuit, a passive electronic component, an active electronic component, and the like.

In the specification, such a term as a "user" may refer to a person who uses an electronic apparatus or an apparatus (for example, an artificial intelligence electronic apparatus) which uses an electronic apparatus.

Figure 1:
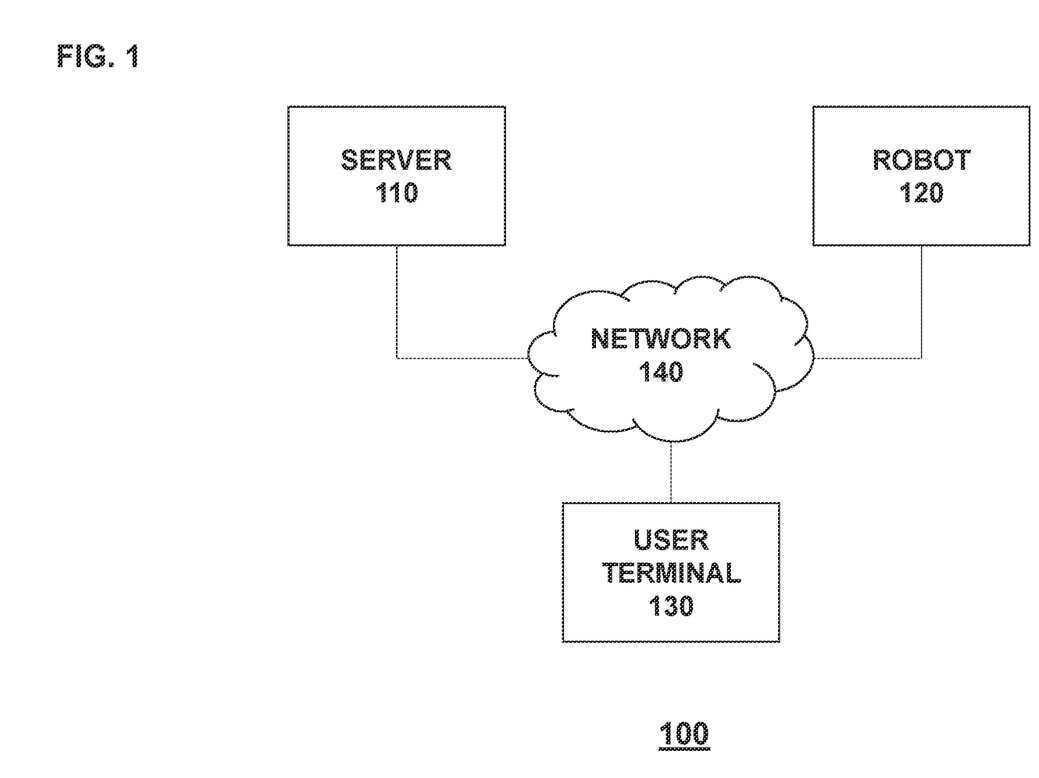
FIG. 1 is a block diagram of a system according to one or more embodiments.

FIG. 1 is a block diagram of a system 100 according to one or more embodiments. The system 100 may include a server 110, robot 120, and a user terminal 130. These components may be connected to each other by network 140 (e.g. a private network, cellular network, and/or the Internet). The user terminal 130 may be e.g. a user equipment such as a smartphone. However, user terminal 130 may also be a personal computer, wearable, tablet, or other suitable device.

Obtaining Spatial Map Data

Figure 2:
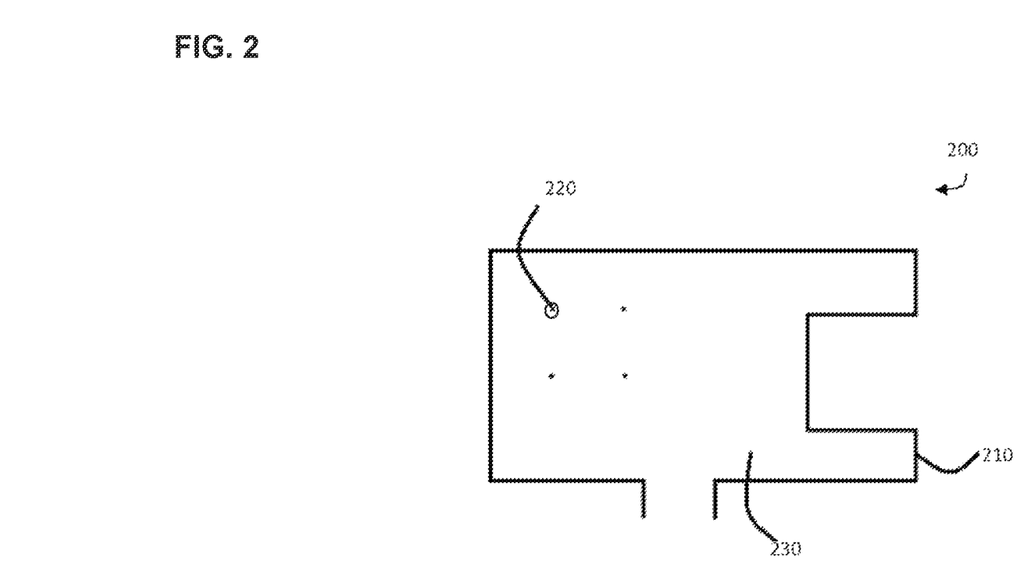
FIG. 2 is a spatial map for a robot according to one or more embodiments.

Embodiments of the system 100 are capable of aligning image data to map data. This may be useful in the context of training robots 120, such as residential or commercial cleaning robots 120. Robots 120 such as RVCs collect map data of their operating environment during operation. As shown in FIG. 2, the robot 120 may include a 2D LiDAR sensor and/or depth-based scanning sensor configured to generate a spatial map 200 that captures a floor layout of the environment 230. The spatial map 200 may contain an outline of the boundaries 210 (i.e. walls) of the environment 230 and obstacles 220 (i.e. furniture) in the environment 230. After sufficient operation time, the spatial map 200 map out a substantial portion of the operating environment 230.

Once the robot 120 is aware of the shape of its environment 230, it can efficiently and thoroughly clean the environment 230, or perform other work in the environment 230. The robot 120 can also avoid dangerous obstacles (e.g. stairwells) once it is aware of their location.

Figure 3:
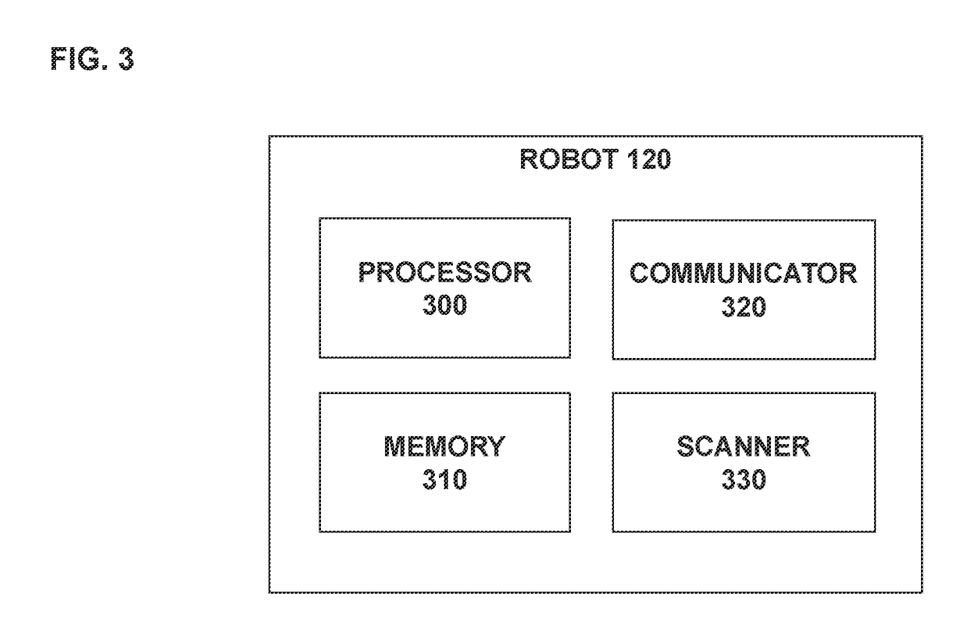
FIG. 3 is a block diagram of a robot according to one or more embodiments.

The hardware configuration of embodiments of the robot 120 is shown in FIG. 3. Robot 120 can generate spatial maps 200 using scanner 330. Scanner 330 may be a 2D LiDAR scanner, three dimensional (3D) LiDAR scanner, camera, RADAR scanner, etc. The scanner 330 collects image and/or range data based on instructions from the at least one processor 300. This data, combined with location data is stored as spatial map 200 in at least one memory 310. The location data may be obtained by distance measurements, Bluetooth or RFID proximity, or navigation such as GPS. The image and/or range data, spatial map 200, and other information can be sent to other devices (e.g. server 110 and user terminal 130) via communicator 320, which is connected to network 140. Communicator 320 can also receive image data and commands from other devices (e.g. server 110 and user terminal 130) to be executed by the at least one processor 300. The communicator 320 may be also referred to as a communication interface.

The robot-generated spatial maps 200 could be improved by adding image data and/or semantic data to the spatial map 200. An example of this is shown in the flowchart in FIG. 4. Here, an RGB-D video of a scene within the environment 230 is aligned and merged with 2D LiDAR spatial map 200. The alignment and merging of the RGB-D video with the 2D LiDAR spatial map 200 may be executed by any of the following or a combination thereof: the server 110, the robot 120, or the user terminal 130. To illustrate, the robot 120 and the user terminal 130 may send the 2D LiDAR map and the RGB-D video to the server 110, respectively. In this scenario, the server 110 may combine the RGB-D video with the 2D LiDAR map. Alternatively, the robot 120 may transmit the 2D LiDAR map to the user terminal 130, or the user terminal 130 may send the RGB-D video to the robot 120, so that either the user terminal 130 or the robot 120 may merge the RGB-D video and the 2D LiDAR map. Embodiments herein include Video-LiDAR Alignment, for aligning videos to 2D LiDAR (or other) maps.

Once semantic data and/or 3D image data is added to the existing spatial map 200, the robot will then know what is in the environment 230 and where those things are located. As a result, the robot will be able to respond to verbal or text commands asking the robot 120 to perform tasks in areas defined by landmarks. These landmarks can include furniture, other objects, boundaries, rooms, etc. . . . Once the spatial map 200 is converted to a composite map by alignment with images, the robot 120 knows these landmarks.

Obtaining Image Data

In order to generate the composite map, RGB or RGB-D images of the environment 230 should be obtained. In some embodiments, these images are obtained by prompting a user to take a video of a portion of the environment 230 using a user terminal 130. This video will produce a large number of frames (plurality of images 400; see FIG. 4). These frames are all from slightly different viewpoints, and can be used to construct a 3D version of the portion of the environment 230 that was recorded, using computer vision techniques.

Such a 3D reconstruction may be performed on the user terminal 130, in the robot 120, or on a server 110. More details on embodiments of the 3D reconstruction procedure are detailed below.

Once a 3D reconstruction of the recorded portion of the environment 230 is generated, the 3D reconstruction is aligned with the spatial map 200, as described in detail below.

Pose Alignment

Figure 4:
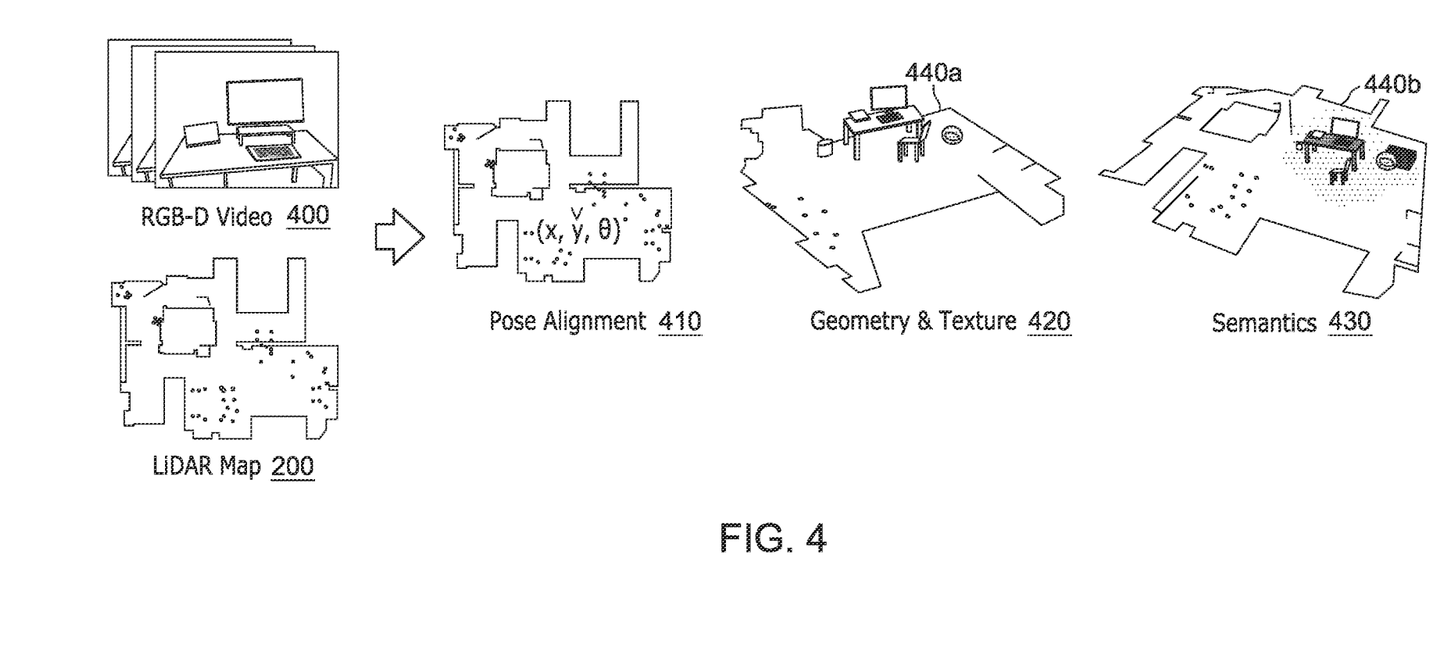
FIG. 4 is a flow chart of image and 2D spatial map alignment according to one or more embodiments.

FIG. 4 shows that given an RGB-D video 550 from an indoor scene and a 2D LiDAR spatial map 200 of the same environment 230, embodiments align the RGB-D video 550 to the 2D LiDAR spatial map 200 by registering a camera pose of the user terminal 130 that records the RGB-D video 550 to the LiDAR coordinate frame of the 2D LiDAR spatial map 200. After registration, embodiments allow augmenting the LiDAR map with 3D geometry, texture and semantics information.

Figure 7:
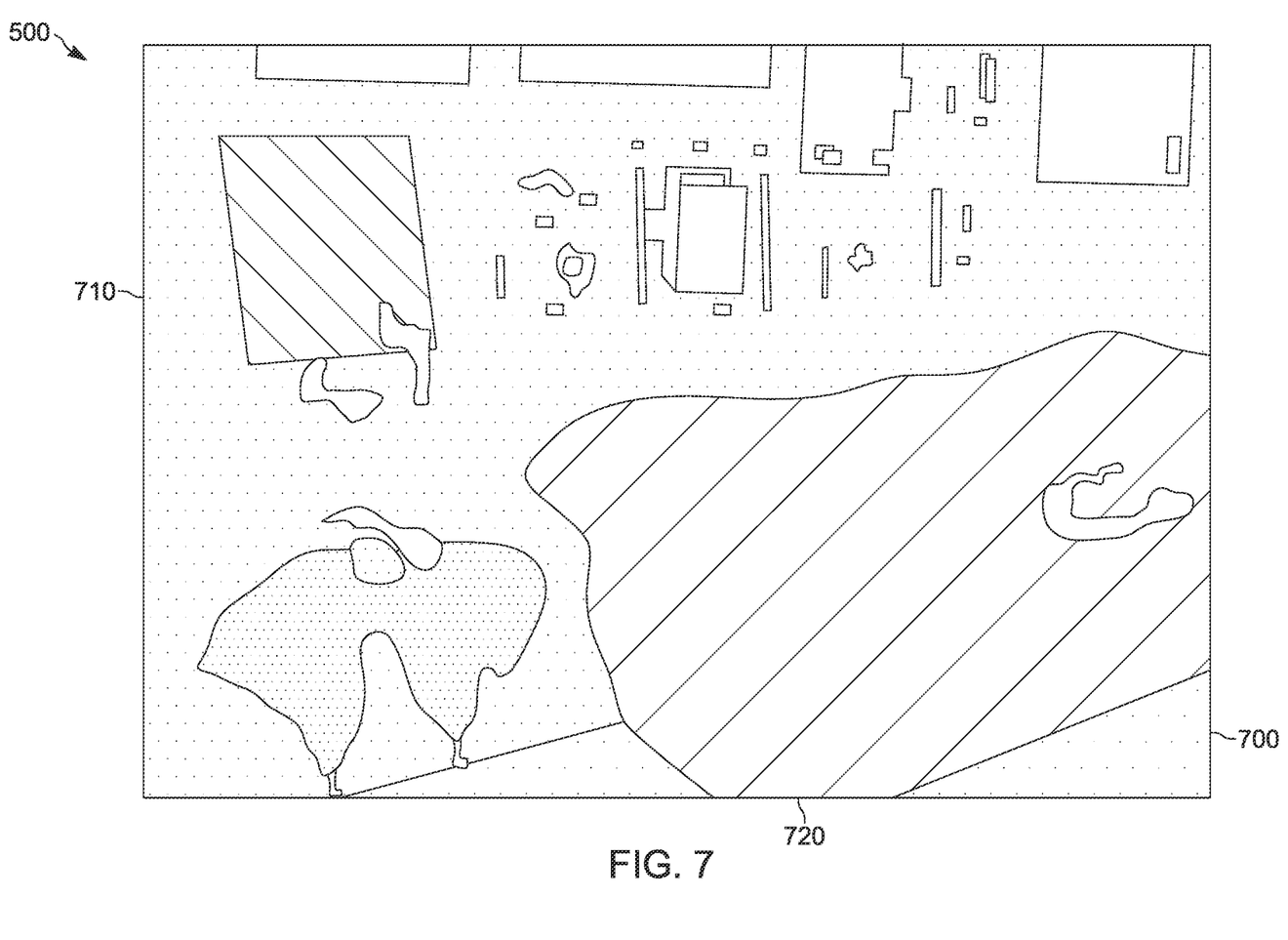
FIG. 7 shows semantic shading of an image according to one or more embodiments.

This can be accomplished in three stages. First, pose alignment 410 is conducted. At this stage, the position of frames of the RGB-D video 550 within the spatial map 200 is determined. In the geometry and texture stage 420, image data from the RGB-D video (alone or in combination with dimensional data from the spatial map 200) is used to render 3D geometry of the objects in the RGB-D video 550. The image data from the RGB-D video is used to add textures to the 3D geometry. Third, semantics 430 can be added to the composite map 440a to generate a combined map with semantics, semantics composite map 440b. Here, different surfaces and objects are identified. In FIG. 7, the different surfaces (floor 700, wall 710), and objects (furniture 720) have been identified and labeled (by shading different colors) in a semantic image or semantic point cloud 500.

In other words, after reconstructing the scene using a simultaneous localization and mapping (SLAM) algorithm and generating the semantic labels in three dimensions (3D) (in particular, to identify the floor), embodiments perform two-dimensional (2D) ray casting at the RVC height to emulate LiDAR measurements taken by the RVC. If the video scan captures a majority of the scene at the RVC height, then embodiments can use the ray cast hit points directly to register with the LiDAR point cloud.

Given an RGB-D video sequence $V=\{I_1, \ldots, I_n\}$ and a 2D point cloud $^LP \in R^{M \times 2}$ captured by the LiDAR sensor of a robot vacuum cleaner, embodiments can register the camera pose of the first frame in the video, to the LiDAR point cloud coordinate frame. In other words, the true transformation $^LT^*_v \in SE(2)$ that aligns the pose of the first image in the video sequence to the LiDAR map is estimated. Embodiments herein solve for the 2D position as well as the yaw angle of the first camera, $(x, y, \theta)^L$. In the following subsections, each of these functions are detailed.

Figure 5:
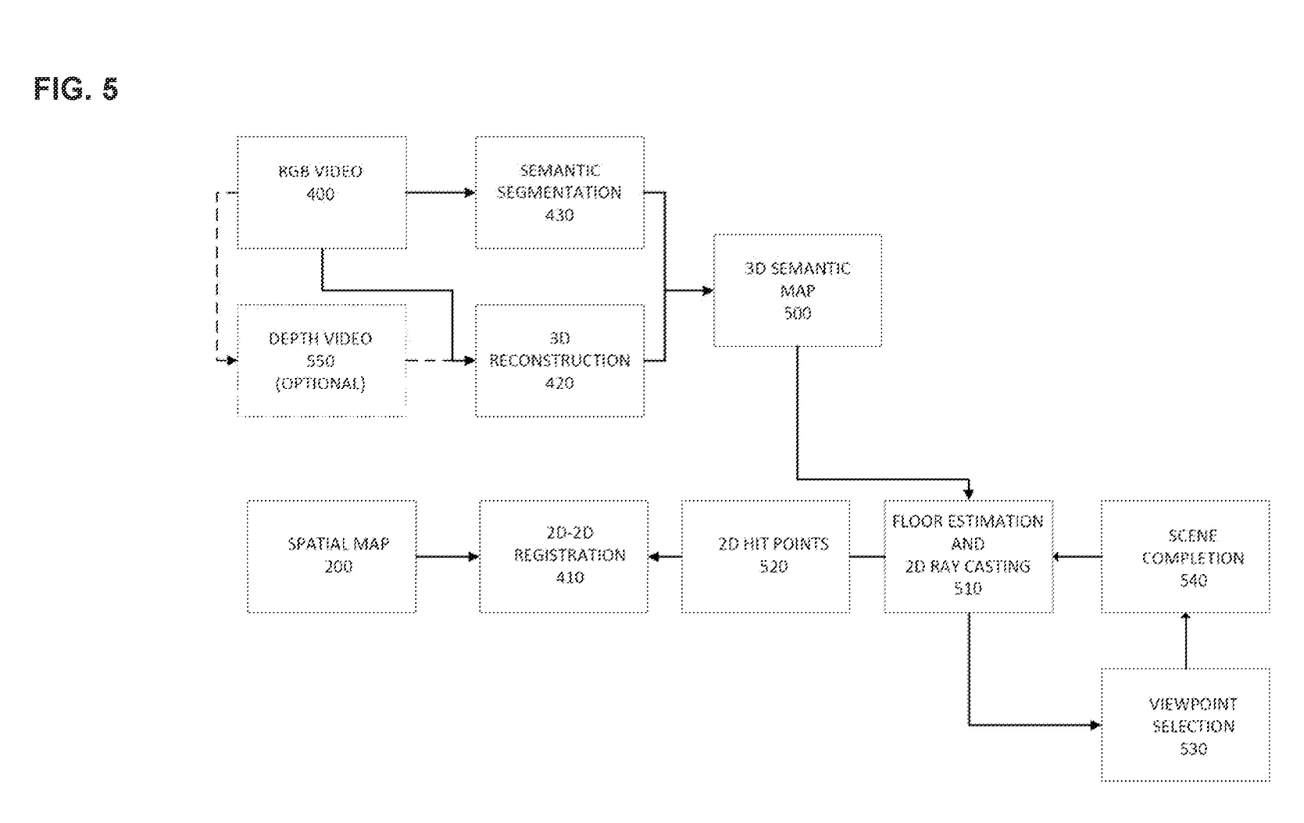
FIG. 5 is a flow chart of a method according to one or more embodiments.

FIG. 5 shows how embodiments herein take as input an RGB video (images 400) and a 2D LiDAR spatial map 200 from uncalibrated sensors, and align these two sources of measurements. In some embodiments, an RGB-D sequence 550 is input into the algorithm. Using off-the-shelf models, embodiments first generate the 3D reconstruction from the texture stage 420 and fuse semantic segmentation labels (semantics 430) from each image to obtain a semantic point cloud 500 (see FIG. 7). After finding the floor surface, embodiments perform 2D ray casting 510 at a desired height to emulate LiDAR measurements. Then, if the synthetic spatial map 520 of these ray casts cover a large portion of the reconstruction they are used directly to align to the input 2D LiDAR scan with a 2D-2D point cloud registration algorithm (pose alignment 410). If not, embodiments use a strategy for viewpoint selection 530 coupled with inpainting-based point cloud completion 540. The final result of these methods is the SE(2) transformation relating the first camera frame to the LiDAR map coordinate frame.

3D Reconstruction and Semantic Segmentation

Embodiments herein use SLAM algorithms to reconstruct 3D point clouds from the RGB-D videos. Embodiments further estimate the segmentation class for each reconstructed 3D point by fusing 2D semantic segmentation into 3D. Embodiments first apply 2D color-based augmentations on the key frames of the SLAM algorithm, then predict the semantic masks of these augmented images using a masked language model. These estimated masks of a single frame can then be fused into a categorical probability distribution $p_i = [p_i^1, \ldots, p_i^C]$ over C classes for each pixel i paired with a confidence score $s_i \in [0, 1]$. To determine the semantics of the reconstructed 3D points, embodiments first project each point x onto the K camera frames where the point is visible using the estimated camera poses from SLAM. Then, embodiments sum over the corresponding probability distribution weighted by the normalized confidence scores. The final semantic label of the point x is determined by the class with the highest probability. Therefore, the class label c(x) of each point is estimated as (Equation 1):

$$c(x) = \arg\max \left( \sum_{i \in K} \frac{S_i}{\sum S_j} p_i \right)$$

Floor Normal Estimation and RVC Viewpoint Projection

After reconstructing the scene from the RGB-D video, the next operation is to simulate what the RVC sees in this scene in order to perform 2D point cloud registration with the LiDAR map. To do so, embodiments first estimate the floor by fitting a plane to the points that are labeled as floor from the semantic labeling. Embodiments assume the ground is always partially visible in the video which is shown herein to usually be the case in casually recorded videos. Embodiments then move the SLAM camera poses down to a predefined RVC height while preserving only the yaw angles, i.e., the y-axis of the camera is parallel to the estimated floor normal. From these down-projected camera poses, embodiments cast rays from the camera centers to the reconstructed 3D points to emulate LiDAR hit points.

Pose Initialization and Optimization

Since SLAM reconstructs the 3D points with respect to the first camera frame, the hit points $^VP \in R^{N \times 2}$ obtained from the 2D ray casting algorithm are also in the first camera frame. After this, embodiments herein are ready to perform 2D-2D point cloud registration between the LiDAR map $^LP$ and the ray cast hit points $^VP$.

Embodiments herein make an initial guess for estimating the relative pose between the two point clouds. Embodiments rasterize both the LiDAR map and the simulated hit points into images, then perform template matching and select the top k poses with the highest correlation scores as initial poses. With these initial poses, embodiments apply CUDA (Compute Unified Device Architecture) parallelization to simultaneously update the poses by minimizing the following loss function (Equation 2):

$$L = \sum_{i \in k} CD\left(^L T_V^{i\,V} P, ^L P\right)$$

where CD denotes the one-directional Chamfer Distance. Embodiments herein compute the Chamfer Distance from the hit points to the LiDAR map after applying the estimated transformations. Finally, the estimated pose is selected as the pose that minimizes the one-directional Chamfer Distance after optimization.

Point Completion Based on Image Inpainting

One failure mode of the aforementioned embodiments occurs when the reconstructed point cloud is missing points at the RVC height, either due to video not capturing the lower part of the scene or the SLAM algorithm suffering from matching featureless points. In this case, the ray cast hit points will be missing several points (i.e., the 2D hit points in FIG. 5) which can cause the matching with LiDAR map to fail due to local minima. Therefore, embodiments herein use a point completion algorithm that utilizes what is already seen in the video to synthesize the missing lower parts. The point completion algorithm leverages a pre-trained text-to-image model to synthesize 3D content at the room scale. However, different from it, embodiments herein start from already seen regions in the video and gradually fills in missing parts at a lower height in an auto-regressive fashion, by performing depth completion from virtual viewpoints selected on the fly depending on the scene geometry.

Virtual Viewpoint Selection

An incomplete point cloud can be completed by filling in missing areas. Since embodiments perform pose registration between the video and the LiDAR map (without necessarily synthesizing the entire scene), embodiments may only complete the parts where the points at the RVC height are missing and have sufficient information in their surroundings. These areas better constrain the inpainting model from hallucinating objects or geometries that do not exist in the real scene.

To provide sufficient information to the inpainting model while covering most of the missing area, embodiments apply a strategy for planning the camera trajectory that starts from one of the camera frames from the recorded video, and sequentially moves back and rotates the camera.

Figure 6:
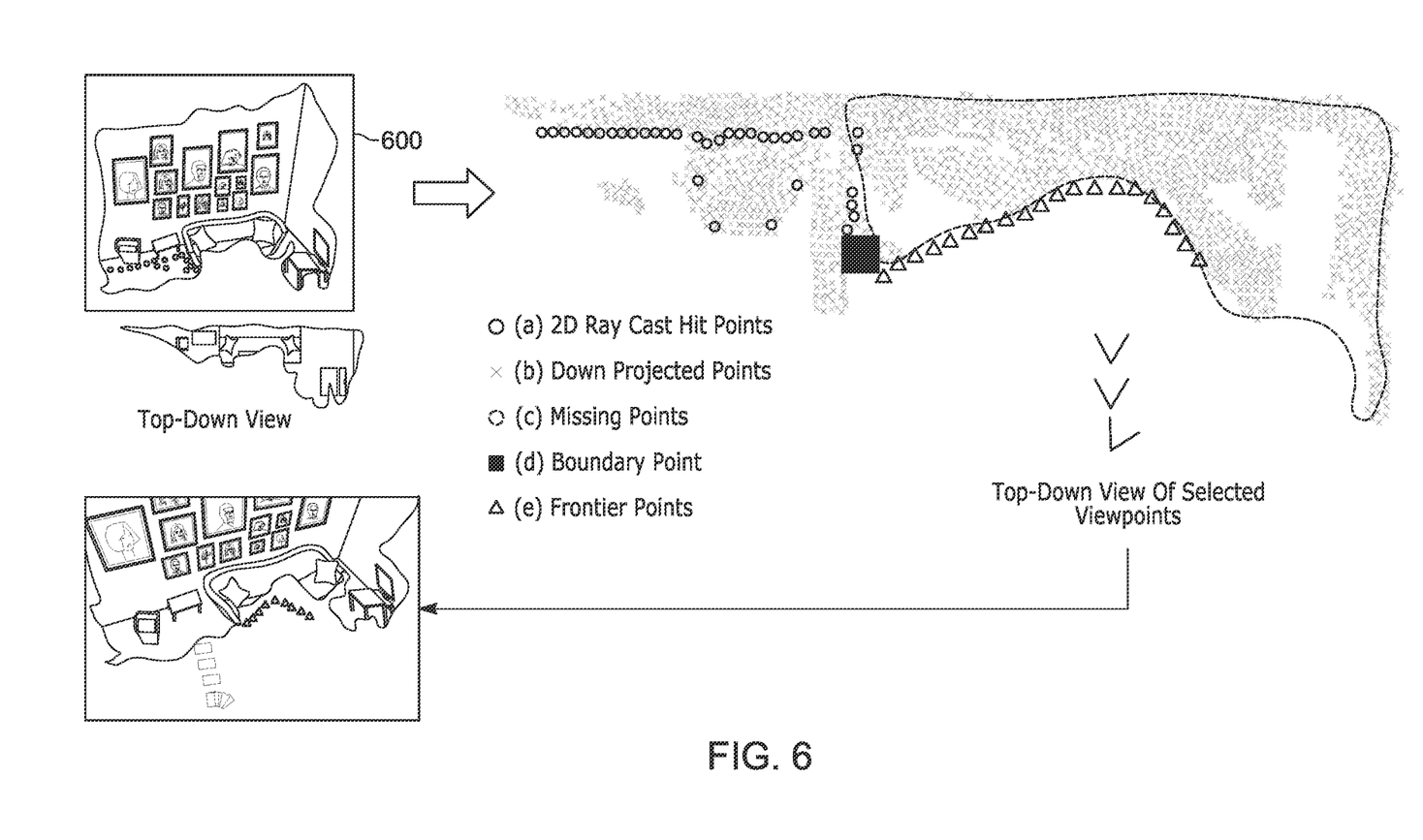
FIG. 6 is a flow chart of viewpoint selection and inpainting according to one or more embodiments.

Specifically, embodiments first find the extreme point (square point in FIG. 6) between the ray cast hit points (circular points in FIG. 6) and the points that are reconstructed points collapsed onto the same plane (x points in FIG. 6). An extreme point is defined as the point in the ray cast hit points that is closest to the missing area. Embodiments fit a concave hull on the collapsed points and sample keypoints (triangle points in FIG. 6) on the hull boundary extending from the extreme point to the uncovered area. After finding the keypoints which approximately represent the area to be completed, embodiments search among all the frames in the video to find the camera that sees the extreme point and has the least pitch angle (i.e., camera looking down). Embodiments start from this camera position and move the camera back along the z-axis with a step size of e.g. 0.5 m, with the camera poses recorded each time it is moved back until half of the keypoints are visible from the viewpoint (V-shaped points in FIG. 6). Then rotation is applied along the floor normal direction with a step size of e.g. 10 degrees until all the keypoints are visible or a maximum rotation threshold (e.g. 30 degrees) is reached. As also shown in FIG. 6, these sequentially recorded camera poses or viewpoints (V-shaped points) are then used later in the point cloud completion algorithm.

To summarize, as shown in FIG. 6, viewpoint selection for the inpainting model. Given the ray cast hit points (circular) and the collapsed point cloud (x-shaped), embodiments first determine the extreme point (square) that represents the boundary of the seen part and the missing area. Then embodiments sample keypoints (triangle) along the concave hull of the collapsed points for camera placement. Embodiments apply a move back-and-rotate camera trajectory (right) to gradually cover these keypoints.

Point Cloud Completion

Given a virtual camera pose, embodiments first render an RGB image from the reconstructed point cloud using a differentiable point cloud renderer at the target viewpoint, along with a binary occupancy image and a depth image. The rendered RGB image is then passed into the stable diffusion inpainting model to fill in the missing part indicated by the mask and a text prompt. The algorithm can be prompted with "a realistic photo of an empty room," so as to discourage the inpainting model from generating novel objects that do not exist in the actual scene. Next, embodiments use a monocular depth estimation method on the inpainted RGB images for lifting the synthesized scene content to 3D. Embodiments back-project and fuse the inpainted areas into the reconstructed point cloud with the known camera parameters and the estimated depths. To better align the geometry of the new content to the reconstructed point cloud, embodiments use the depth values rendered from the initial reconstruction as input, and treat the monocular depth estimation method as a depth completion algorithm. Furthermore, embodiments obtain a semantic segmentation of the inpainted image, and for the pixels predicted to be in the floor class, embodiments use their depths to the estimated floor plane as additional supervision to the depth completion network.

After inpainting new scene content from all the virtual viewpoints and completing the reconstructed point cloud, rays are cast again from the RVC height cameras to obtain the hit points as mentioned previously and use the pose estimation algorithm to perform 2D point cloud registration with the LiDAR map.

However, certain parts of the operating environment (e.g. a house) might be easily accessible to the RVC, but not to the user recording the video, which can cause missing regions in the 3D reconstruction that lead to poor registration performance. In addition, wall surfaces with little to no texture might result in few reconstructed 3D points. To address these missing regions of the reconstruction, embodiments can leverage a pre-trained text-to-image model to synthesize images at novel viewpoints, and lift them to 3D with a depth completion algorithm in a geometrically consistent fashion. This can be seen in FIG. 6. The resulting completed point cloud can be used to perform 2D ray casting at the RVC height and 2D-2D point cloud registration with respect to the LiDAR map.

Methods of Aligning Image Data and Map Data

Figure 8:
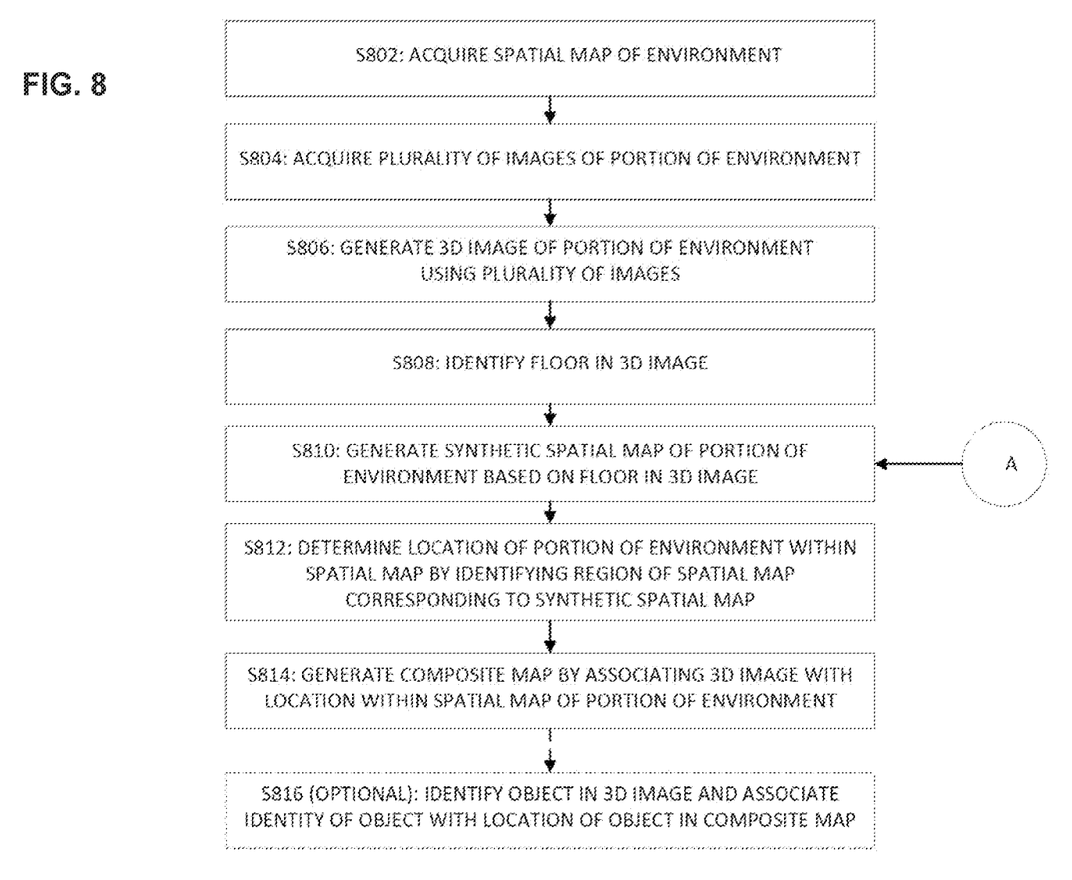
FIG. 8 is flow chart of a method according to one or more embodiments.

Embodiments herein provide a method of generating a composite map from image data and spatial map data, such as shown in FIG. 8. The method includes the operation of acquiring a spatial map 200 of an environment 230 (S802); acquiring a plurality of images 400 of a portion of the environment 230 (S804); generating a 3D image 600 of the portion of the environment 230 using the plurality of images 400 (S806); identifying a floor 700 in the 3D image 600 (S808); generating a synthetic spatial map 520 of the portion of the environment 230 based on the floor 700 in the 3D image 600 (S810); determining a location of the portion of the environment within the spatial map 200 by identifying a region of the spatial map 200 that corresponds to the synthetic spatial map 520 (S812); and generating a composite map 440a by associating the 3D image 600 with the location within the spatial map 200 of the portion of the environment (S814). In some embodiments, the method further includes identifying an object in the 3D image 600; and associating an identity of the object with a location of the object in the composite map 440a (S816).

In some embodiments, determining the location of the portion of the environment within the spatial map 200 by identifying the region of the spatial map 200 that corresponds to the synthetic spatial map 520 (S812) comprises: estimating edges of the floor using ray casting; and determining an alignment between the estimated edges of the floor and the spatial map 200 of the environment 230.

Figure 9:
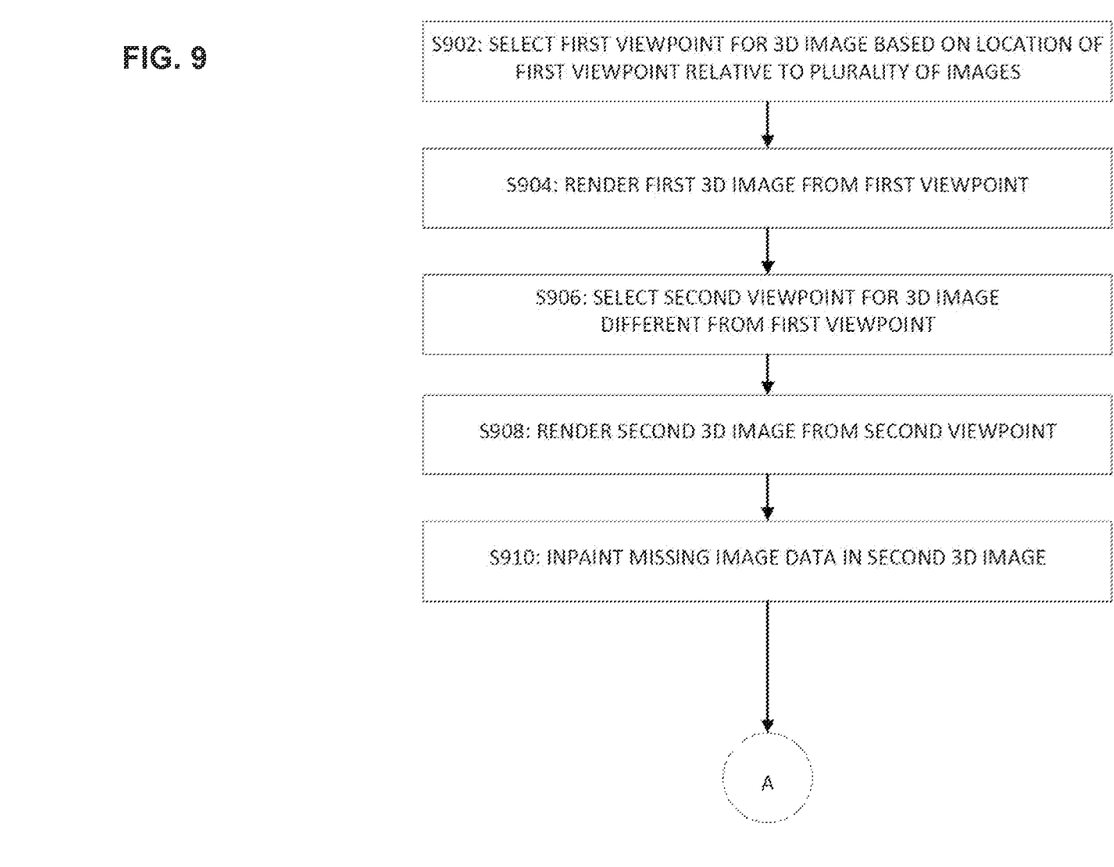
FIG. 9 is flow chart of a method according to one or more embodiments.

FIG. 9 shows further embodiments of the method. In such embodiments, the method further includes: in the 3D image 600, inpainting areas of the portion of the environment that are not in the plurality of images 400. In some embodiments, the method further includes: selecting a first viewpoint for the 3D image 600 based on the location of the first viewpoint relative to the plurality of images 400 (S902); rendering a first 3D image 600 from the first viewpoint (S904); selecting a second viewpoint for the 3D image 600 different from the first viewpoint (S906); rendering a second 3D image 600 from the second viewpoint (S908); and inpainting missing image data in the second 3D image 600 (S910).

Information Processing Apparatus Aligning Image Data and Map Data

In some embodiments the operations above are performed by an information processing apparatus. The information processing apparatus may be the server 110, the robot 120, or the user terminal 130 (see FIGS. 1 and 3). In embodiments where the information processing apparatus is the robot 120, the robot receives the plurality of images 400 from the user terminal via network 140, and performs the operations locally on at least one processor 300 and at least one memory 310.

In embodiments where the information processing apparatus is the server 110, the server receives the spatial map 200 from the robot 120 and receives the plurality of images from the user terminal 130 via network 140. The server 110 performs the operations locally on at least one processor and at least one memory located on the server.

In embodiments where the information processing apparatus is the user terminal 130, the user terminal 130 obtains the spatial map data from the robot 120 via network 140, and performs the operations locally on at least one processor and at least one memory in the user terminal 130.

Alternatively, the spatial map 200 and plurality of images 400 may be stored on the server 110, and transferred to another server 110, a robot 120, or a user terminal 130 for alignment.

Embodiments herein register videos to 2D LiDAR scans, which can enable: i) enriching 2D LiDAR maps with texture and semantics for better user experiences, and ii) making use of LiDAR maps as a common medium to localize short clips of videos taken from different locations in an indoor environment. Embodiments herein provide a technique to register 3D reconstructions of local areas to 2D LiDAR maps captured from indoor environments such as residential, commercial, or industrial spaces.

Embodiments include a strategy for viewpoint selection and leverage a text-to-image model to synthesize images at locations with missing information to aid a point cloud registration algorithm.

Performance of embodiments herein can be evaluated on two large scale datasets using real videos and synthetic LiDAR maps, in addition to another self-collected dataset of real videos and LiDAR scans.

Embodiments of the method and apparatus (robot, computer, user terminal) described herein improve the functioning of a computer by improving the operation of the robot. To do this, the various embodiments use analysis techniques limited to the realm of computer technology, such as computer vision. Moreover, the maps and images are recorded, improved, and distributed using computer hardware such as scanners, robots, servers, user terminals, cameras, processors, memory, and network communication hardware. Finally, the problem of poor responsiveness of robots to user commands herein is a problem limited to the realm of computer technology. Thus, embodiments herein are necessarily rooted in computer technology in order to overcome a problem specifically arising in the realm of computer networks.

While certain embodiments of the disclosure has been particularly shown and described, it will be understood that various changes in form and details may be made therein without departing from the spirit and scope of the following claims.

What is claimed is:

1. An information processing apparatus for generating a composite map from image data and spatial map data, the information processing apparatus comprising:
   at least one memory storing instructions; and
   at least one processor operatively connected to the at least one memory, the at least one processor being configured to execute the instructions to:
     acquire a spatial map of an environment;
     acquire a plurality of images of a portion of the environment;
     generate a three-dimensional (3D) image of the portion of the environment using the plurality of images;
     identify a floor in the 3D image;
     generate a synthetic spatial map of the portion of the environment based on the floor in the 3D image;
     determine a location of the portion of the environment within the spatial map by identifying a region of the spatial map that corresponds to the synthetic spatial map; and
     generate a composite map by associating the 3D image with the location within the spatial map of the portion of the environment.

2. The information processing apparatus of claim 1, wherein the at least one processor is further configured to execute the instructions to:
   in the 3D image, inpaint areas of the portion of the environment that are not in the plurality of images.

3. The information processing apparatus of claim 2, wherein the at least one processor is further configured to execute the instructions to:
   select a first viewpoint for the 3D image based on the location of the first viewpoint relative to the plurality of images;
   render a first 3D image from the first viewpoint;
   select a second viewpoint for the 3D image different from the first viewpoint;
   render a second 3D image from the second viewpoint; and
   inpaint missing image data in the second 3D image.

4. The information processing apparatus of claim 3, wherein the first viewpoint is selected as a boundary point in a top-down view of the 3D image.

5. The information processing apparatus of claim 1, wherein determining the location of the portion of the environment within the spatial map by identifying the region of the spatial map that corresponds to the synthetic spatial map comprises:
   estimating edges of the floor using ray casting; and
   determining an alignment between the estimated edges of the floor and the spatial map of the environment.

6. The information processing apparatus of claim 1, wherein the spatial map of the environment is generated using two-dimensional Light Detection and Ranging, (2D LiDAR).

7. The information processing apparatus of claim 1, wherein the plurality of images is obtained from a video of the portion of the environment.

8. The information processing apparatus of claim 1, wherein the at least one processor is further configured to execute the instructions to:
   identify an object in the 3D image; and
   associate an identity of the object with a location of the object in the composite map.

9. The information processing apparatus of claim 1, wherein the spatial map is generated by a robot.

10. The information processing apparatus of claim 1, wherein the plurality of images are generated by a user terminal.

11. A method of generating a composite map from image data and spatial map data, the method comprising:
  acquiring a spatial map of an environment;
  acquiring a plurality of images of a portion of the environment;
  generating a three-dimensional (3D) image of the portion of the environment using the plurality of images;
  identifying a floor in the 3D image;
  generating a synthetic spatial map of the portion of the environment based on the floor in the 3D image;
  determining a location of the portion of the environment within the spatial map by identifying a region of the spatial map that corresponds to the synthetic spatial map; and
  generating a composite map by associating the 3D image with the location within the spatial map of the portion of the environment.

12. The method of claim 11, further comprising:
  in the 3D image, inpainting areas of the portion of the environment that are not in the plurality of images.

13. The method of claim 12, further comprising:
  selecting a first viewpoint for the 3D image based on the location of the first viewpoint relative to the plurality of images;
  rendering a first 3D image from the first viewpoint;
  selecting a second viewpoint for the 3D image different from the first viewpoint;
  rendering a second 3D image from the second viewpoint; and
  inpainting missing image data in the second 3D image.

14. The method of claim 13, wherein the first viewpoint is selected as a boundary point in a top-down view of the 3D image.

15. The method of claim 11, wherein determining the location of the portion of the environment within the spatial map by identifying the region of the spatial map that corresponds to the synthetic spatial map comprises:
  estimating edges of the floor using ray casting; and
  determining an alignment between the estimated edges of the floor and the spatial map of the environment.

16. The method of claim 11, wherein the spatial map of the environment is generated using two-dimensional Light Detection and Ranging, (2D LiDAR).

17. The method of claim 11, wherein the plurality of images is obtained from a video of the portion of the environment.

18. The method of claim 11, further comprising:
  identifying an object in the 3D image; and
  associating an identity of the object with a location of the object in the composite map.

19. The method of claim 11, wherein the spatial map is generated by a robot.

20. The method of claim 11, wherein the plurality of images is generated by a user terminal.

* * * * *